No. 794,615. PATENTED JULY 11, 1905.
R. H. GOLDSBOROUGH.
TURBINE.
APPLICATION FILED MAR. 14, 1905.
3 SHEETS—SHEET 1.
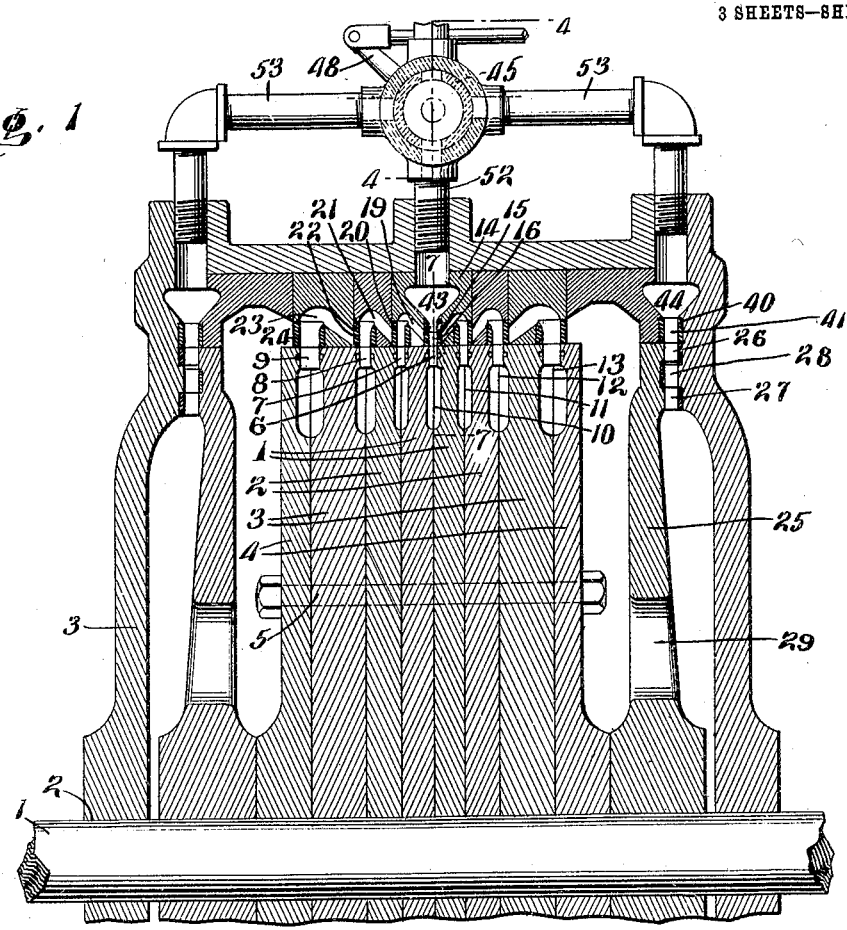
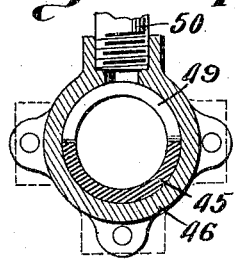
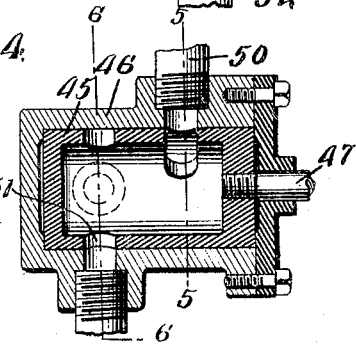
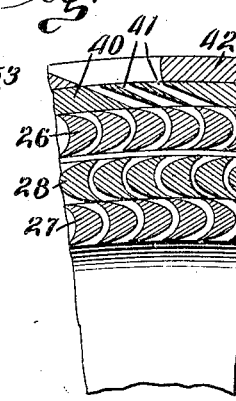
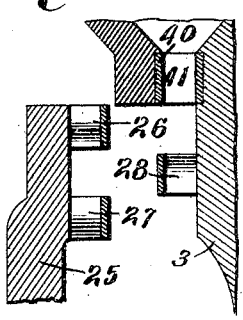
Inventor
Richard H. Goldsborough.
Witnesses
H. G. Robinette
E. L. Horn
By
G. Ayres
Attorney

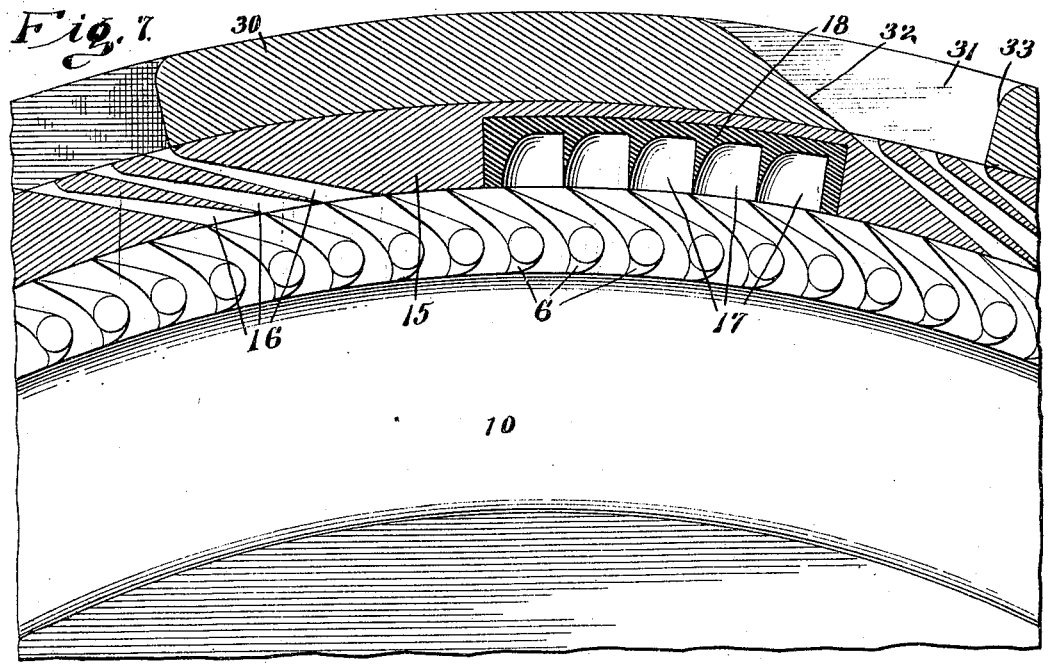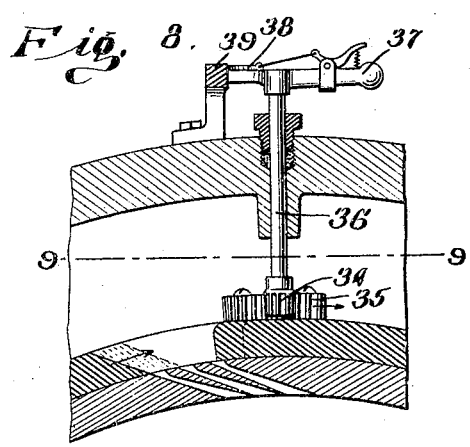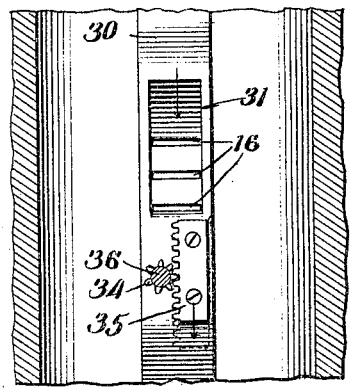

No. 794,615. PATENTED JULY 11, 1905.
R. H. GOLDSBOROUGH.
TURBINE.
APPLICATION FILED MAR. 14, 1905.
3 SHEETS—SHEET 3.
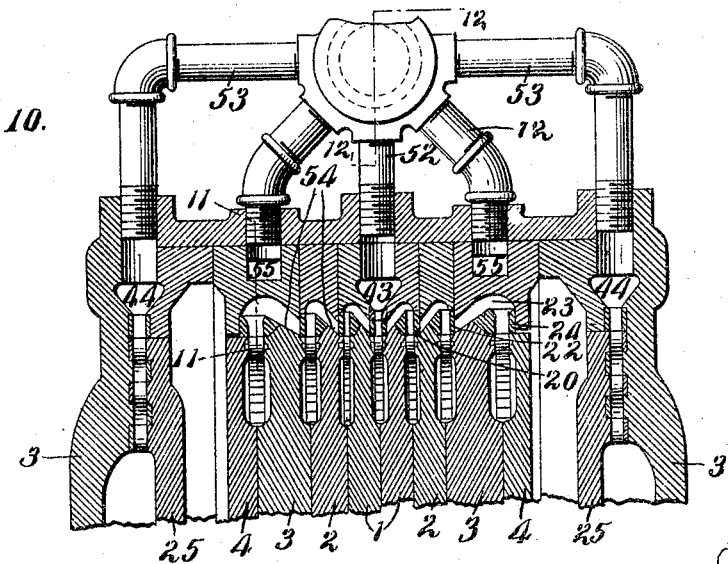
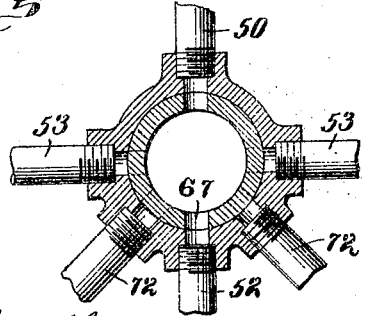
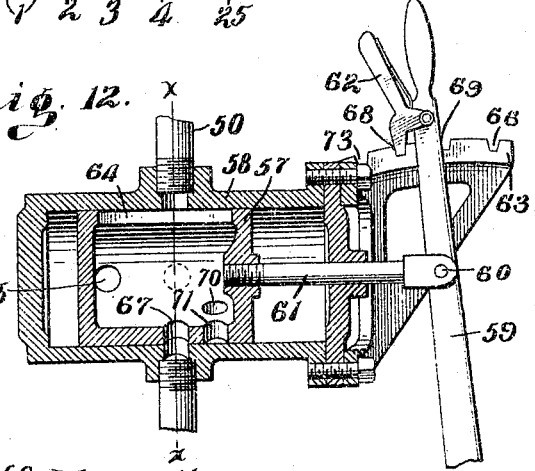
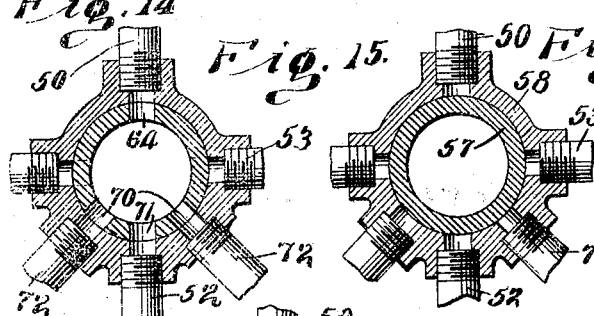
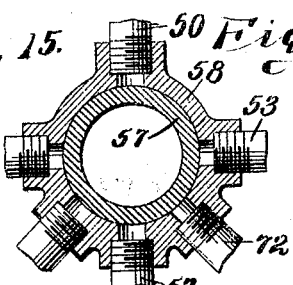
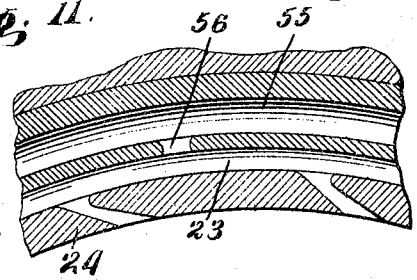
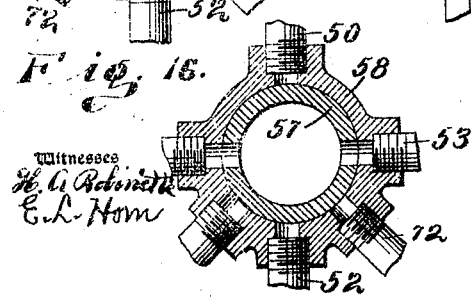
Inventor
Richard H. Goldsborough.
Witnesses
H. G. Robinett
E. L. Horn
By G. Ayres
Attorney No. 794,615.

Patented July 11, 1905.

UNITED STATES PATENT OFFICE.

RICHARD H. GOLDSBOROUGH, OF WASHINGTON, DISTRICT OF COLUMBIA.

TURBINE.

SPECIFICATION forming part of Letters Patent No. 794,615, dated July 11, 1905.

Application filed March 14, 1905. Serial No. 249,987.

*To all whom it may concern:*

Be it known that I, RICHARD H. GOLDSBOROUGH, a citizen of the United States, residing at Washington, in the District of Columbia, have invented certain new and useful Improvements in Turbines, of which the following is a specification.

My invention relates to turbines; and it consists in the constructions, combinations, and arrangements herein described and claimed.

The objects of my invention are to provide a compound type of turbine in which the losses occurring during the expansion and regeneration of the steam will be minimized.

A further object of my invention is to provide a compound type of turbine which can be efficiently controlled in a simple and convenient manner by regulating the steam-supply to its initial stage.

A further object of my invention is to provide an improved type of compound turbine in which the steam-supply to either the intermediate or last stages can be reinforced in a highly-efficient manner by the addition of live steam.

A further object of my invention is to provide a simple and compact reversing means for turbines which is constructed to avoid the usual wasteful load on the turbine during the latter's normal forward motion.

In the accompanying drawings, forming a part of this application, and in which similar reference symbols indicate corresponding parts in the several views, Figure 1 is a partial longitudinal sectional view illustrating one embodiment of my invention. Fig. 2 is a detail sectional view illustrating a modification in which the reversing-wheels are provided with governing-rings. Fig. 3 is a sectional view, on a larger scale, showing the stationary and moving vanes of one of the reversing-wheels separated. Fig. 4 is a sectional view, on an enlarged scale, taken on the line 4 4 of Fig. 1. Fig. 5 is a sectional view on the line 5 5 of Fig. 4. Fig. 6 is a sectional view on the line 6 6 of Fig. 4. Fig. 7 is a detail sectional view, on an enlarged scale, taken on the line 7 7 of Fig. 1. Fig. 8 is a detail sectional view illustrating one means for actuating the adjustable governing-ring. Fig. 9 is a sectional elevation on the line 9 9 of Fig. 8. Fig. 10 is a partial longitudinal sectional view illustrating a modification of the construction shown in Fig. 1, provided with means for reinforcing the steam-supply in the final stages of the turbine. Fig. 11 is a detail sectional view, on an enlarged scale, taken on the line 11 11 of Fig. 10. Fig. 12 is a detail sectional view on the line 12 12 of Fig. 10; and Figs. 13, 14, 15, and 16 are sectional views on the line $x$ $x$ of Fig. 12, illustrating the several positions of the valve in its casing.

Referring to Figs. 1 to 9 of the drawings, 1 indicates a turbine-shaft suitably journaled at 2 in the heads 3 of a turbine-casing and carrying two sets of disks 1, 2, 3, and 4, clamped together by bolts 5. A central annular series of vanes 6, constituting the initial series of vanes, are secured between the disks 1, and two lateral sets of annular series of vanes 7, 8, and 9 are secured, respectively, between the pairs of disks 1 and 2, 2 and 3, and 3 and 4. Annular chambers 10, 11, 12, and 13 are provided in the disks within the respective annular series of vanes 6, 7, 8, and 9 for receiving the discharge therefrom, said chambers being preferably formed of greater width than the vanes to eliminate friction of the rapidly-entering steam-current against their side walls. A central annular member 14 is supported in the turbine-casing and carries a central ring 15, provided with groups of admission-ports 16 for directing an actuating medium inwardly against the central series of vanes 6 and with intermediate groups of exhaust-ports 17 for receiving the actuating medium discharged outwardly through said vanes, as shown especially in Fig. 7. Each group of exhaust-ports 17 is shown formed in a block 18, inserted across the inner periphery of the ring 15, and said exhaust-ports are constructed to deflect the steam or other actuating medium laterally in both directions into annular passages 19, arranged to conduct the steam about the outer periphery of two port-rings 20, surrounding the annular series of vanes 7. Each ring 20 is provided with groups of admission and exhaust ports similar to those of the ring 15; but the aggregate cross-section of these ports is preferably greater than that of those in the ring 15 in order to accommodate the expansion of the steam prior to its passage therethrough. The exhaust-ports in each ring 20 are constructed to deflect the steam laterally through an annular passage 21 to the outer periphery of a port-ring 22, provided with admission and exhaust ports for the corresponding annular series of vanes 8, these ports being similar to those just described, but preferably of greater aggregate cross-section. The exhaust-ports in each ring 22 are constructed to deflect the steam laterally through an annular passage 23 to the outer periphery of a port-ring 24, provided with inlet and exhaust ports for the corresponding annular series of vanes 9. The steam may be deflected from the exhaust-ports in each ring 24 to port-rings of a succeeding annular series of vanes or into the turbine-casing, as shown in Fig. 1. A reversing-wheel 25, carried by the turbine-shaft at each side of the sets of disks 1, 2, 3, and 4, is provided with two concentric annular series of vanes 26 and 27. An annular series of intermediaries or stationary guide-vanes 28, interposed between the two series of vanes 26 and 27, is carried by the adjacent head 3 of the turbine-casing. A port-ring 40, arranged about the outer periphery of the annular series of vanes 26, is provided with groups of admission-ports 41 for directing steam at an efficient angle against said vanes. The wheels 25 are shown provided with a plurality of apertures 29 for maintaining free communication between the opposite faces of said wheels. A governing-ring 30 is adjustably mounted on the outer periphery of the port-ring 15 of the initial series of vanes 6 and provided with an aperture 31 for each group of admission-ports 16. As shown especially in Fig. 7, each aperture 31 is provided with a rear wall 32, having an inclination substantially similar to that of the rear walls of the ports 16 and arranged to constitute a continuation of such rear wall of the first port in the corresponding group when the governing-ring is in its unadjusted normal position. The front wall 33 of each aperture is preferably formed radially and spaced from the inner edge of the rear wall a distance equal to the entire circumferential width of the group of ports. As shown in Fig. 2, similar governing-rings 42 may be employed for controlling the ports 41 of the reversing-wheels. Any suitable automatically-controlled or manually-operated means may be employed for shifting the governing-ring. I have illustrated for this purpose a pinion 34, meshing with a rack 35 on the governing-ring and carried by a spindle 36, extending through the turbine-casing. A handle 37 on the spindle is provided with any suitable form of spring-latch 38, arranged to engage a graduated and notched sector 39 for determining the adjusted position of the governing-ring and locking the parts in their adjusted positions. An annular steam-chest 43, surrounding the governing-ring 30. supplies steam through the apertures 31 to the several groups of admission-ports 16 of the initial series of vanes 6, similar steam-chests 44 being provided for supplying steam to the ports 41 of the reversing-wheels. A common valve 45 for controlling the supply of steam to the several steam-chests 43 and 44 is rotatably mounted in a casing 46 and provided with a spindle 47, carrying a crank 48 for actuating it. The valve is shown hollow and provided with a feed-port 49, extending around approximately ninety degrees of its circumference and arranged to control communication of the steam-supply pipe 50 with the interior of the valve. Two diametrically opposite supply-ports 51 are arranged to control the supply of steam from the interior of the valve to the several steam-chests 43 and 44, said supply-ports being shown arranged in a different plane from that of the feed-port.

Figs. 4, 5, and 6 illustrate the valve adjusted to supply steam to the annular chest 43 during the normal forward operation of the turbine. In this position of the valve steam from the main supply-pipe 50 is admitted through the port 49 into the interior of the valve, from which it passes through one of the supply-ports 51 to the pipe 52, leading to the steam-chest 43. To reverse the motion of the turbine, the valve is turned from its illustrated position through ninety degrees either to the right or left, thereby bringing the supply-ports 51 into registry with the two pipes 53, leading to the respective steam-chests 44, while maintaining the feed-port 49 in communication with the main steam-pipe 50. When it is desired to cut off the steam-supply, the valve is turned either to the right or left through approximately two hundred and seventy degrees from the position shown, thereby shutting off communication of the main pipe 50 with the interior of the valve and also cutting off communication of the interior of the valve with the several pipes 52 and 53. In the operation of this embodiment of my invention steam is maintained at any desired pressure within the annular chest 43 during the normal forward motion of the turbine, from which it flows through the apertures 31 and is directed by the admission-ports 16 at an efficient angle against the outer periphery of the initial annular series of vanes 6. The steam is discharged inwardly from said vanes into the circumscribed annular chamber 10, which has an annular cross-section at its outer end considerably greater than the aggregate cross-section of the steam-currents discharging thereinto. The steam flowing inward through the chamber 10 passes successively through portions thereof of decreasing cross-section, thereby causing a material regeneration of the steam-pressure at the zone of maximum cross-section adjacent the inner periphery of the annular series of vanes 6. The steam is subsequently deflected in said annular chamber and flows outwardly therethrough and through the vanes 6 to the exhaust-ports 17 intermediate of the entering currents. During such outward flow of the steam it passes successively through portions of said chamber of increasing cross-section until it finally reaches the zone of maximum cross-section adjacent the inner periphery of the annular series of vanes 6, which latter cause a material reduction in the cross-section of the steam-current, with a resultant regeneration of pressure adjacent their inner edges. From the above description it will be seen that the steam flowing inwardly through the chamber 10 passes successively through portions of decreasing cross-section and that in its subsequent outward flow through said chamber it passes successively through portions of increasing cross-section. The annular chamber 10 thereby constitutes, in effect, an hour-glass passage for the steam, having its end dammed by the vanes 6. The steam in passing outwardly through the vanes 6 expands sufficiently to produce an efficient difference of pressure between the inner and outer peripheries thereof and is deflected by the exhaust-ports 17 laterally in both directions to the annular passages 19. The steam flowing through the passages 19 passes successively through portions thereof of increased cross-section, with a resultant regeneration of the steam-pressure at the point of greatest cross-section adjacent the entrance-orifices of the ports in the port-rings 20 of the annular series of vanes 7. The steam is then directed successively through the annular series of vanes 7 into their circumscribed annular chambers 11, through the annular series of vanes 8, into their circumscribed annular chambers 12, and through the annular series of vanes 9 into their circumscribed annular chambers 13 in a manner similar to that just described. The steam flowing outwardly from each annular chamber 13 through the circumscribing series of vanes 9 is finally deflected into the interior of the turbine-casing, which latter is preferably arranged in communication with a condenser in any usual manner.

It will be noted that during the foregoing-described forward motion of the turbine the reversing-wheels 25 and their vanes 26 and 27 will rotate idly in an attenuated medium corresponding to the tension maintained in the turbine-casing by the condenser, and consequently that wasteful friction of such idle reversing parts will be reduced to a minimum.

When it is desired to reverse the turbine, the valve 45 is shifted to cut off the supply-pipe 52 and to admit steam through the pipes 53 to the two annular steam-chests 44. The steam is conducted from each chest 44 through the ports 41, which are inclined oppositely to the ports of the main turbine-wheel in order to direct the steam at an efficient angle against the outer annular series 26 of reversing-vanes. The steam discharged from the inner edges of the vanes 26 is deflected by the stationary guide-vanes 28 at an efficient angle to the inner series 27 of reversing-vanes, from which it is discharged into the turbine-casing and finally escapes to the condenser.

It will be noted that the main turbine-wheel, comprising the sets of disks 1, 2, 3, and 4, rotates idly during such reversing of the turbine and that the friction incident to such idle motion of the main wheel is reduced to a minimum by the attenuation of the medium maintained within the turbine-casing. In the construction just described the peripheries of the several disks 1 2 3 4 and reversing-wheels 25 lie in a common cylindrical plane, thereby permitting all the rotating parts to be readily and conveniently withdrawn from the turbine-casing by removing one of the heads 3 thereof.

Figs. 10 to 16 illustrate a modified construction, in which the disks 1 2 3 4 and the reversing-wheels 25 are mounted in the turbine-casing in a manner similar to that shown in Fig. 1. The peripheries of said disks, however, are provided with inclined portions 54, arranged in rotative relation to correspondingly-inclined portions of the adjacent port-rings, and in this construction the rotating parts cannot be withdrawn from the casing without simultaneously stripping said port-rings and their supporting annular members from the casing. In addition to the annular steam-chests 43 and 44 this modification is provided with two supplemental annular steam-chests 55, having apertures 56 for admitting reinforcing-steam to the main steam-supply flowing through the annular passages 23. The steam admission to the several annular chests 43, 44, and 55 is controlled by a common valve 57, slidably mounted in a valve-casing 58. A shifting lever 59 is pivoted at 60 to the valve-spindle 61 and provided with a hand-latch 62, arranged to engage a notched sector 63 for locking the valve in its several adjusted positions. A feed-port 64 is formed in the wall of the hollow valve 57 of sufficient length to maintain communication between the main steam-pipe 50 and the interior of said valve throughout the latter's entire range of movement. Two diametrically opposed reversing-ports 65 are formed in the valve-wall in position to register with the pipes 53 for admitting steam to the reversing-chests 44 when the valve has been shifted to one of its extreme positions by locking its actuating-lever 59 in the notch 66. A single port 67 is formed in the valve-wall in position to register with the main forward supply-pipe 52 when the valve is shifted to one of its intermediate positions by locking its actuating-lever 59 in the notch 68, the ports 65 and 67 being spaced apart a sufficient distance axially along said valve to permit their being shifted out of registry with their respective pipes when the valve-actuating lever is locked in the notch 69 for cutting-off the steam from all the steam-chests. Two ports 70 and a third port 71 are formed in the valve-wall in position to register, respectively, with the two reinforcing-pipes 72 and the main forward supply-pipe 52 when the valve has been shifted into its other extreme position by locking the actuating-lever 59 in the notch 73. In the normal inoperative position of the valve the lever 59 is locked in the notch 69, from which position it can be swung either to the right for reversing or to the left for admitting steam to the forward chest 43 or simultaneously to said chest and to the reinforcing-chests 55. The operation of this modification is exactly similar to that shown in Fig. 1, with the exception that means are provided for admitting reinforcing-steam to the main steam-supply during its expansion. I have illustrated means for providing such reinforcement to the steam entering the final series of vanes; but obviously the reinforcing steam-chests 55 could be arranged in communication with the main steam-supply at any desired point.

Having thus described my invention, what I claim as new, and desire to secure by Letters Patent, is—

1. In a turbine, the combination of a turbine-wheel comprising a plurality of disks provided with annular recesses in their side faces which coöperate to form annular chambers, and a plurality of annular series of vanes clamped between said disks and circumscribing said annular chambers, each series of vanes constructed of a width less than that of the circumscribed chamber, substantially as described.

2. In a turbine, the combination of a turbine-wheel, an annular series of vanes carried thereby, and a port-ring surrounding the outer periphery of said annular series of vanes and provided with alternately-arranged groups of admission and exhaust ports extending across the periphery of said annular series of vanes, substantially as described.

3. In a turbine, the combination of a turbine-wheel, an annular series of vanes carried thereby, a plurality of groups of admission-ports arranged to direct steam against the outer periphery of said annular series of vanes, and a plurality of groups of exhaust-ports arranged about the periphery of said annular series of vanes intermediate of said admission groups and constructed to deflect the exhaust laterally in both directions, substantially as described.

4. In a turbine, the combination of a turbine-wheel, an annular series of vanes carried thereby, a plurality of groups of admission-ports arranged to direct steam against the outer periphery of said annular series of vanes, a plurality of groups of exhaust-ports arranged intermediate of said admission groups, and adjustable means for successively controlling said admission-ports, said adjustable means constructed to simultaneously control the corresponding ports of the several groups, substantially as described.

5. In a turbine, the combination of a turbine-wheel, an annular series of vanes carried thereby, a port-ring surrounding the outer periphery of said annular series of vanes, and provided with alternately-arranged groups of admission and exhaust ports, and adjustable means for successively controlling said admission-ports, said adjustable means constructed to simultaneously control the corresponding ports of the several groups, substantially as described.

6. In a turbine, the combination of a turbine-wheel, an annular series of vanes carried thereby, a port-ring surrounding the outer periphery of said annular series of vanes and provided with alternately-arranged groups of admission and exhaust ports, and a governing-ring adjustably mounted on said port-ring and provided with a controlling-aperture for each of said groups of admission-ports, substantially as described.

7. In a turbine, the combination of a turbine-wheel, an annular series of vanes carried thereby, a port-ring surrounding the outer periphery of said annular series of vanes and provided with alternately-arranged groups of admission and exhaust ports, and a governing-ring adjustably mounted on said port-ring and provided with a controlling-aperture for each of said groups of admission-ports, said apertures formed with rear walls having an inclination substantially similar to that of the rear walls of the admission-ports and constructed to successively control the ports of the corresponding groups, substantially as described.

8. In a turbine, the combination of a turbine-wheel, an annular series of vanes carried thereby, a port-ring surrounding the outer periphery of said annular series of vanes and provided with alternately-arranged groups of admission and exhaust ports, a governing-ring adjustably mounted on said port-ring and provided with a controlling-aperture for each of said groups of admission-ports, and means for indicating the adjusted position of said governing-ring and for locking it in its several adjusted positions, substantially as described.

9. In a turbine, the combination of a turbine-wheel, an annular series of vanes carried thereby, a port-ring surrounding the outer periphery of said annular series of vanes and provided with alternately-arranged groups of admission and exhaust ports, a governing-ring adjustably mounted on said port-ring and provided with a controlling-aperture for each of said groups of admission-ports, a rack carried by said ring, a pinion engaging said rack, a spindle carrying said pinion and extending through the turbine-casing, a latch carried by said spindle, and a graduated notched sector arranged in coöperative relation to said latch, substantially as described.

10. In a turbine, the combination of a shaft, a casing, a main turbine-wheel mounted on said shaft, a reversing turbine-wheel carried by said shaft at each side of said main wheel and provided with apertures for maintaining free communication to the casing from both sides of said several wheels, substantially as described.

11. In a turbine, the combination of a shaft, a main turbine-wheel mounted on said shaft, reversing turbine-wheels carried by said shaft, an independent steam-chest for each of said wheels, and a common valve constructed to control the steam supplied to said several chests, substantially as described.

12. In a turbine, the combination of a shaft, a main turbine-wheel mounted on said shaft, two reversing turbine-wheels carried by said shaft, an independent steam-chest for each of said wheels, a valve-casing, an independent connection from said casing to each of said steam-chests, and a valve mounted in said casing and provided with two ports constructed to control said several connections, substantially as described.

13. In a compound turbine, the combination of a main turbine-wheel, a plurality of annular series of vanes carried by said wheel, means constructed to conduct a main steam-supply successively through said series of vanes, means for admitting reinforcing-steam to such main steam-supply subsequent to its passage through the initial series of such vanes, a reversing turbine-wheel, means for supplying steam to said reversing-wheel, and a common valve constructed to control the steam supplied to said main wheel and reversing-wheels and the admission of the reinforcing-steam, substantially as described.

In testimony whereof I affix my signature in presence of two witnesses.

RICHARD H. GOLDSBOROUGH.

Witnesses:
 G. AYRES,
 EDWIN S. CLARKSON.